(12) United States Patent
Hassel

(10) Patent No.: US 8,950,979 B2
(45) Date of Patent: Feb. 10, 2015

(54) METHOD FOR LAYING A PIPELINE ON THE SEABED AND A PIPELINE INSTALLATION DEVICE

(75) Inventor: Jan Helge Hassel, Røyken (NO)

(73) Assignee: FMC Kongsberg Subsea AS, Kongsberg (NO)

( * ) Notice: Subject to any disclaimer, the term of this patent is extended or adjusted under 35 U.S.C. 154(b) by 368 days.

(21) Appl. No.: 13/386,406

(22) PCT Filed: Jul. 22, 2010

(86) PCT No.: PCT/NO2010/000290
§ 371 (c)(1),
(2), (4) Date: May 18, 2012

(87) PCT Pub. No.: WO2011/010938
PCT Pub. Date: Jan. 27, 2011

(65) Prior Publication Data
US 2012/0224924 A1 Sep. 6, 2012

(30) Foreign Application Priority Data
Jul. 23, 2009 (NO) .................................. 20092752

(51) Int. Cl.
*F16L 1/16* (2006.01)
(52) U.S. Cl.
CPC ....................... *F16L 1/16* (2013.01)
USPC ......... 405/169; 405/170; 405/172; 405/184.4
(58) Field of Classification Search
CPC .................. F16L 1/12; F16L 1/16; F16L 1/26
USPC ............. 405/169, 170, 172, 158, 166, 168.1, 405/168.3, 184.4
See application file for complete search history.

(56) References Cited

U.S. PATENT DOCUMENTS

| | | | | |
|---|---|---|---|---|
| 3,591,204 A * | 7/1971 | Shipes | ............................ | 285/26 |
| 3,604,731 A * | 9/1971 | Petersen | ......................... | 285/29 |
| 3,968,838 A * | 7/1976 | Baugh | ........................... | 166/347 |
| 4,051,688 A * | 10/1977 | Ells et al. | ....................... | 405/170 |
| 4,094,163 A * | 6/1978 | Ells et al. | ....................... | 405/170 |
| 5,807,027 A * | 9/1998 | Ostergaard | ..................... | 405/170 |
| 5,890,841 A * | 4/1999 | Friis et al. | ....................... | 405/170 |
| 6,004,072 A * | 12/1999 | Cunningham | ................ | 405/170 |
| 7,086,807 B2 | 8/2006 | Mackinnon | | |
| 7,503,727 B2 * | 3/2009 | Ingebretsen et al. | ......... | 405/169 |
| 7,794,177 B2 * | 9/2010 | DeLack | ........................ | 405/172 |

(Continued)

FOREIGN PATENT DOCUMENTS

| GB | 2 343 493 A | | 5/2000 |
|---|---|---|---|
| GB | 2487423 | * | 9/2010 |

(Continued)

*Primary Examiner* — Frederick L Lagman

(57) ABSTRACT

The present invention regards a method for laying pipelines on the seabed comprising the steps of attaching an end (2) of the pipeline (1) to a structure (10, 20), lowering the structure with the pipeline to the seabed, allowing the pipeline end to pivot relative the structure, measuring the inclination of the pipeline end relative to the seabed, modifying a pipe spool such that one end is given the same inclination of the end as the pipeline and that at least one part of the pipe spool will be resting on the seabed after connection, connecting the pipe spool to the pipeline. The invention also regards a pipeline installation device where at least a one side of a top structure is allowed to move relative a foundation structure.

14 Claims, 4 Drawing Sheets

(56) References Cited

U.S. PATENT DOCUMENTS

| | | | |
|---|---|---|---|
| 8,408,842 B2 * | 4/2013 | Cafaro et al. | 405/169 |
| 8,628,272 B2 * | 1/2014 | Alliot | 405/170 |
| 2007/0269270 A1 * | 11/2007 | Bastesen et al. | 405/170 |
| 2008/0286050 A1 * | 11/2008 | DeLack | 405/172 |
| 2009/0297274 A1 * | 12/2009 | Cafaro et al. | 405/170 |

FOREIGN PATENT DOCUMENTS

| | | |
|---|---|---|
| WO | WO 95/31669 A1 | 11/1995 |
| WO | WO 98/36200 A1 | 8/1998 |
| WO | WO 01/79736 A1 | 10/2001 |
| WO | WO 2008/063080 A1 | 5/2008 |
| WO | WO 2008/155747 A2 | 12/2008 |

* cited by examiner

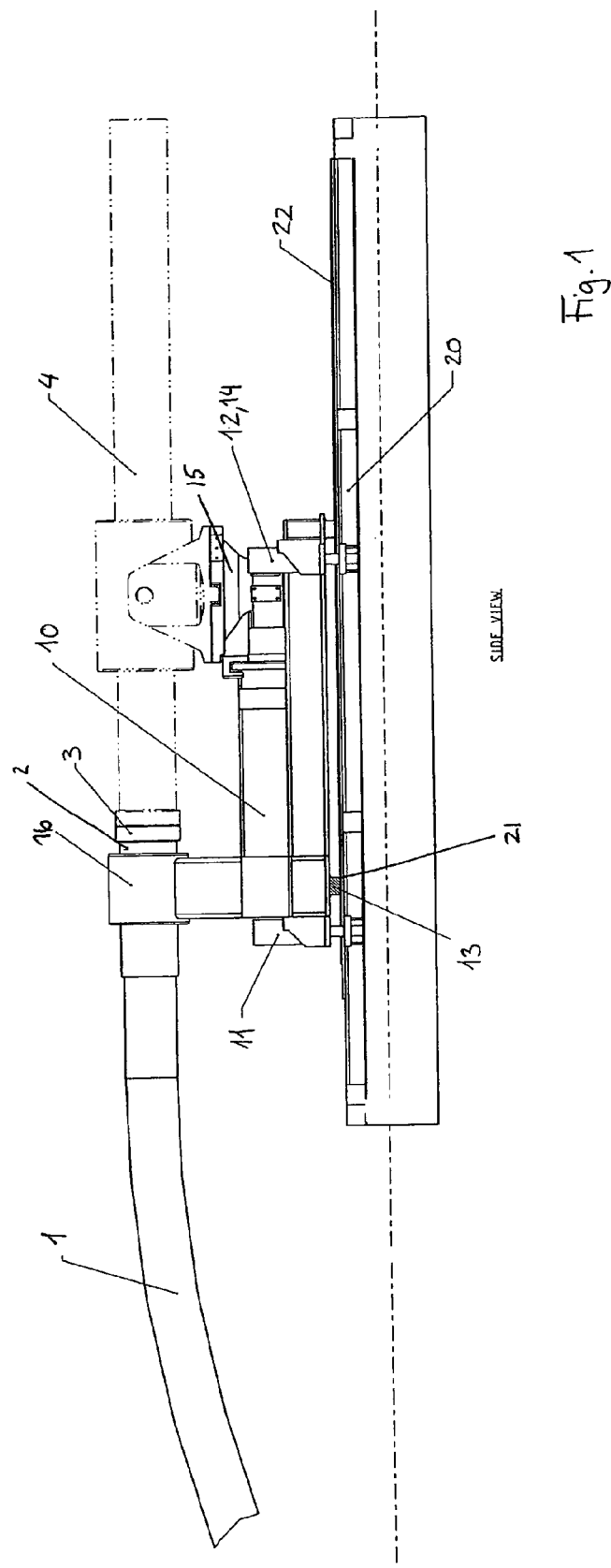

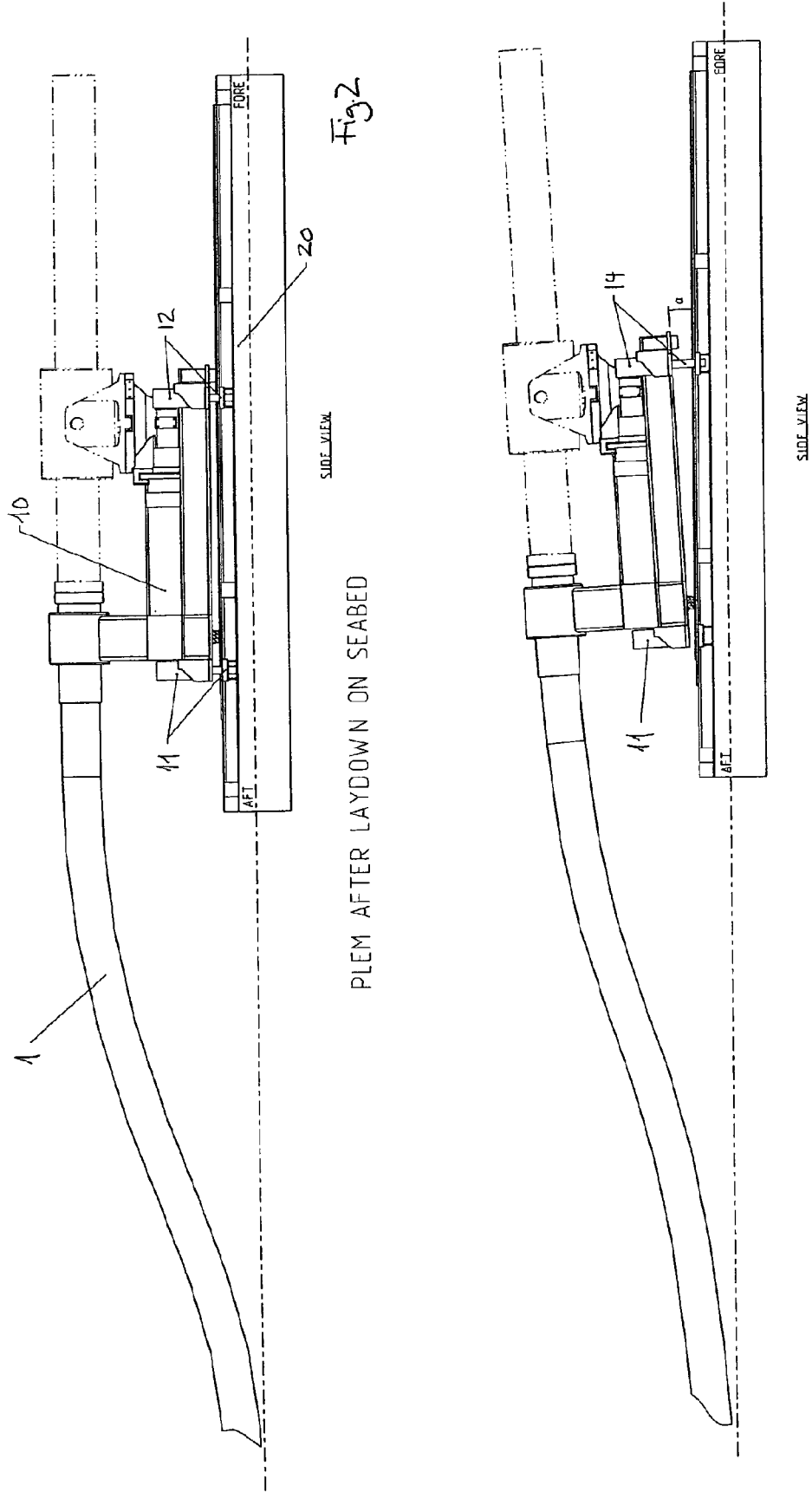

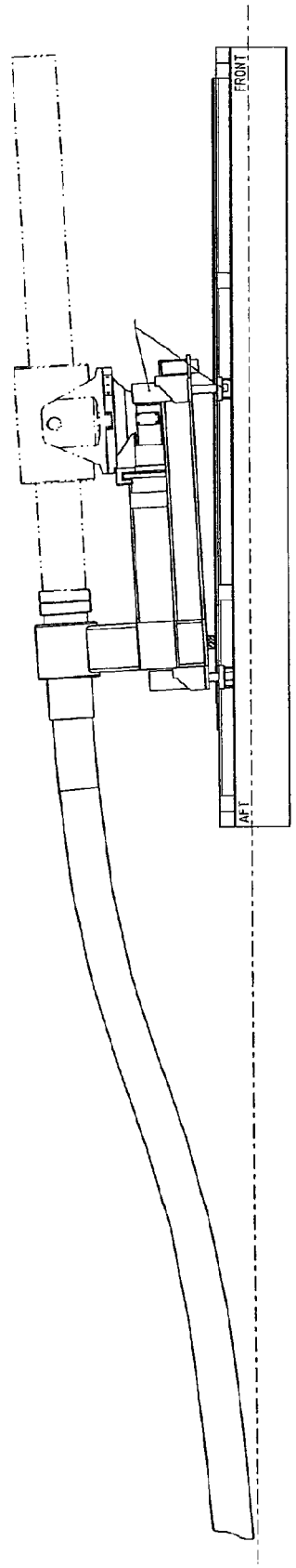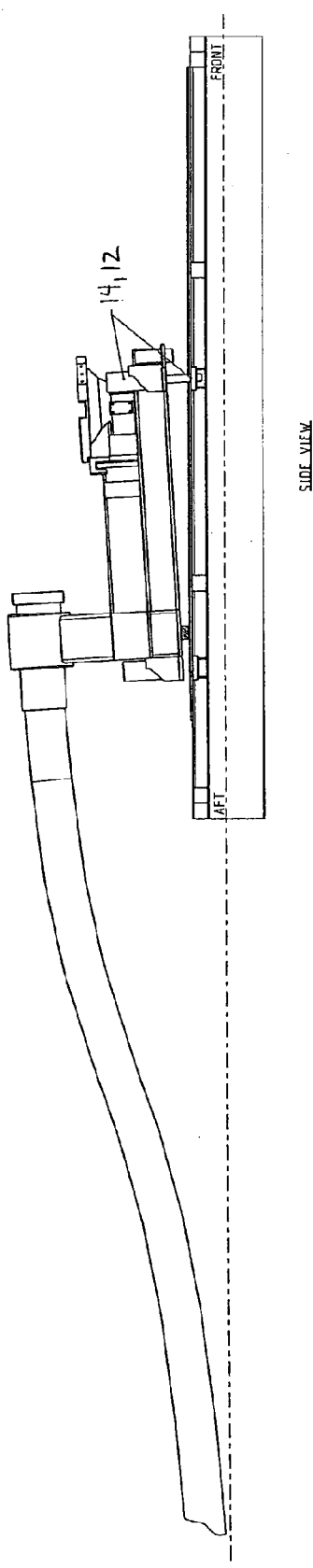

METHOD FOR LAYING A PIPELINE ON THE SEABED AND A PIPELINE INSTALLATION DEVICE

The present invention relates to a method for laying a pipeline on the seabed and a pipeline installation device.

BACKGROUND OF THE INVENTION

As the offshore petroleum industry develops, with subsea installations and processing, and also develops further from land and at greater water depths, there is a need for laying larger and longer pipelines on the seabed. These pipelines may be pipelines from platforms or subsea facilities to onshore facilities, pipelines between subsea facilities, between platforms or vessels and between platforms and subsea facilities.

DESCRIPTION OF THE RELATED ART

There are several known methods for connecting pipelines subsea, where one pipeline end is laid on the seabed, and another pipeline end should be connected to the end of the already laid pipeline. In this solution the second pipeline is laid on the seabed in a given position and then pulled into connection with the already laid pipeline. One such solution is described in U.S. Pat. No. 5,807,027. Another possible solution not requiring pull operations is described in U.S. Pat. No. 5,921,713. In this solution there is used a mechanical joint, formed by connectors provided with telescopic capacity avoiding any pull requirements for both sections of the pipeline. A spool pipe is installed between the end of the pipelines or the en end of a pipeline and another subsea structure.

When a pipeline is laid on the ground and connected to another pipeline end or to a fixed structure there will normally in this connection be a structure element which is more rigid than the pipeline itself. The structure element used to connect the pipeline ends will normally have a height and the pipeline ends will normally be connected on a surface of the structure element with a distance from the seabed. The pipeline end is also connected to the structure so that the pipeline at the end has a longitudinal axis which is fixed, in a normally mainly horizontal direction. To achieve such a connection to the structure a part of the pipeline has to be lifted off the seabed to the given height and into the connection with the structure element. The part of the pipeline that is lifted off the seabed has a weight and this will induce moments in the connection to the structure. There will also be temperature expansions in the connection during the lifespan of the connection. These elements make it difficult to calculate the moments in the connection, and the structure elements and pipeline must therefore be designed to withstand a large range of moments.

SUMMARY OF THE INVENTION

The object of the invention is to obviate some of said drawbacks with known solutions by providing a method and device which give less moments in the connection.

This need is met with a method and device as defined in the attached claims.

According to the invention the method for laying a pipeline on the seabed comprises the step of attaching an end of the pipeline to a structure. The end of the pipeline is to be connected to another pipeline or other structure on the seabed. According to the invention the method then comprises lowering the structure with the pipeline to the seabed, allowing the pipeline end to pivot relative the structure, measuring the inclination of the pipeline end relative to a horizontal plane, preparing a pipe spool such that one end is given the same inclination of that end as the pipeline end and connecting the pipe spool to the pipeline, such as to reduce the bending moments in the connection.

The pipe spool may be modified by arranging the pipe spool to cause practically no vertical forces in the connection to the pipeline, thereby reducing the bending moments in the connection. One possible way of arranging the pipe spool to cause practically no vertical forces is for instance to arranging at least one part of the pipe spool to be resting on a surface after connection. The surface may be the seabed or surface of a structure positioned on the seabed, for instance a part of the structure whereto the pipeline is attached. The pipe spool may be U-shaped, or W-shaped, to provide the pipe spool to rest on a surface. Another possible solution is to arranged the pipe spool such that it has no gravity forces when positioned in the water. The gravity forces of the pipe spool may be counteracted by buoyancy forces of the pipe spool or by means attached to the pipe spool as it is submerged in water.

By allowing the pipeline end to pivot relative the structure when laid on the seabed, the moment between the pipeline and the structure is kept at a minimum as the pipeline is given the most natural shape. As the structure is positioned on the seabed and the pipeline end is attached to but allowed to pivot relative the structure, a longitudinal axis of the pipeline at the pipeline end will normally form an angle other than zero with a horizontal plane. This horizontal plane may be mainly parallel to the seabed. The angle will vary dependent on the height difference between the position of the rest of the pipeline and the point where the end of the pipeline is connected to the structure. The angle may also depend on the orientation of the seabed around the point of connection. By having the pipeline end pivoting relative the structure, there is achieved a situation where the most of the pipeline will naturally rest on the seabed and thereby with minimum moment in the connection between the pipeline and the structure. This in contradiction to previous solutions where the pipeline end has been fixed relative the structure, and where a longitudinal axis of the pipeline end normally would be given a position mainly parallel with the structure, thereby forcing a larger part of the pipeline to be lifted from the seabed, and thereby creating larger moments between the structure and the pipeline.

Preparing the pipe spool may be done by modifying a pre-fabricated U-shaped pipe spool or forming or modifying another kind of pipe spool. The pipe spool should preferably be made to rest on a surface which possibly could be the seabed, thereby not introducing unnecessary moments in the connection with the pipeline. By having the pipe spool rest on the seabed it will apply practically no vertical forces in the connection to the pipeline end. The pipe spool should preferably also be made with a curvature as a U-shape, or double U-shape, to be able to absorb any temperature expansion variations when the spool is connected to the pipeline end. Another possibility is as said to provide the pipe spool with buoyancy, thereby reducing and possibly eliminate the vertical forces of the pipe spool in the connection.

According to an aspect of the invention the method may comprise locking the pipeline end in the inclined position before measuring the inclination, and releasing the locking of the pipeline end after the pipe spool is connected to the pipeline. By this one ensures that the measurement is made with a fixed system. It is also favorable to have the pipeline end fixed relative the structure when the pipe spool is connected to the pipeline. The method may comprise moving the longitudinal axis of the pipeline end to a position mainly parallel with the structure and or the ground and then locking the pipeline end in this position for connection of the pipe spool, and thereafter releasing the pipeline end from the locked position, such that it may pivot back to the inclined position.

According to the invention the pipeline end will after connection with the pipe spool, be free to pivot relative the structure.

According to one aspect of the invention the method may comprise the step of actively pivoting the pipeline end to the inclined position. According to another aspect it may comprise allowing the pipeline end to pivot by its own weight.

There may to the pipeline be connected an end unit and the method according to the invention may comprise the steps of removing such an end unit, connected to the end of the pipeline, after the pipeline end has rested in the inclined position.

According to another aspect the method may comprise allowing the pipe end to be shifted along the structure. With this one is preventing further moment in the connection as the pipeline, pipe spool and connection experiences thermal expansion and contraction and due to the freedom in the relative horizontal direction will not build moments in the system.

According to another aspect the method may comprises forming the pipe spool with a curvature, and at least one part adapted to be resting on the seabed. Having the pipe spool resting on the seabed, will unload the system with most of the weight of the pipe spool, which weight if not resting on the seabed, will induce moments in the system. Also the curvature of the pipe spool which may be formed as a U-shape will prevent excessive moments in the system as it will be more adapted to handle thermal expansions and contractions.

According to the invention there is also provided a pipeline installation device. The device comprises a foundation structure adapted for positioning on the seabed, a top structure attached to the foundation structure, where the top structure has means for the attachment of a pipeline. According to the invention at least one side of the top structure is arranged to be movable relative the foundation structure.

By having the pipeline end connected to a top structure which has at least one degree of freedom relative a foundation structure, which is fixed relative the seabed, the moments in the connection are reduced.

According to an aspect of the invention the at least one side of the top structure may be arranged to be pivotal relative to the foundation structure. The pivot axis may in one embodiment be arranged to be mainly transverse to a longitudinal axis of the pipeline. This will result in that a pipeline end connected to the top structure would be allowed to move in a plane mainly perpendicular to the seabed. There will during use be variations in/from this as the seabed in not a level surface. This will give the pipeline end one degree of freedom.

According to another aspect the top structure may be attached to the foundation structure with connection means, arranged such that the top structure pivots relative the foundation structure in a first state of the connection means and is prevented from pivoting in a second state of the connection means.

The connection means may have several configurations. One possible solution is to have the top structure connected to the foundations structure with hinge means, allowing pivotal movements and in addition to the hinge means have locking means. The locking means when activated will prevent the top structure from pivoting. The locking means may be configured such that it may lock the top structure from pivoting in one or several positions.

As an alternative to hinge means, the connection means may comprise an abutment part of the top structure, which abutment part abuts against a surface part of the foundation structure. The abutment part and the surface part are configured such that the top structure pivots about the abutment part which acts as a fulcrum for the top structure.

The connection means may comprise one or more locking means. The locking means may be formed as an integral solution in the hinge means or abutment means, and or as separate means. The locking means may also be removable attached to the structure.

According to another aspect the connection means may comprises jacking means for actively pivoting the end of the top structure relative the foundation. These jacking means may also in one embodiment also form part of the locking means of the connection means; in another embodiment they may be separate from the locking means.

According to another aspect the top structure may be arranged to be movable along the foundation structure. This freedom of movement may be independent of the pivotal movement of the top structure. By introducing such a freedom the pipeline end will have at least one other degree of freedom relative the foundation structure, and thereby reduce the moments in the connection further. The lateral movement of the top structure relative the foundation structure may be independent of the state of the connection means between the top structure and the foundation structure. The movement along the foundation structure may be in a direction mainly in a plane comprising a longitudinal axis of the pipeline end. The connection means may for the part connected to the foundation structure, be formed in a gliding section of the foundation structure which is formed to glide along a gliding surface of the foundation structure. Alternatively the abutment part of the top structure may be arranged to be gildeable along the gliding surface of the foundation structure. The gliding surface may be formed with stopping means limiting the movement of the gliding section. There may also be locking means preventing movement between the gliding section and the rest of the foundation structure. These locking means may in one embodiment be integrated with at least one of the locking means of the connection means.

According to another aspect the top structure may be arranged to be moveable along the foundation structure in two directions. This may be achieved by having two sets of gliding sections and gliding surfaces. Alternatively the top structure may be arranged to pivot about two axes. Such configurations will give the pipeline end three degrees of freedom relative the foundation structure.

According to yet another aspect the means for attachment of a pipeline to the top structure may comprise a swivel, allowing the device to rotate about a longitudinal axis of the pipeline to be connected to the device. By introducing such a feature the pipeline end is given yet a further degree of freedom, thereby reducing the moments further.

The device may comprise any or all the aspect as described above and any suitable combination of the different elements described.

BRIEF DESCRIPTION OF THE DRAWINGS

The invention will now be explained with a non-limiting embodiment with reference to the attached drawings where:

FIG. 1 is a side view of a device according to the invention, and

FIGS. 2-7 illustrate the sequence of steps during laying of a pipeline.

DETAILED DESCRIPTION OF THE INVENTION

Figure 6:
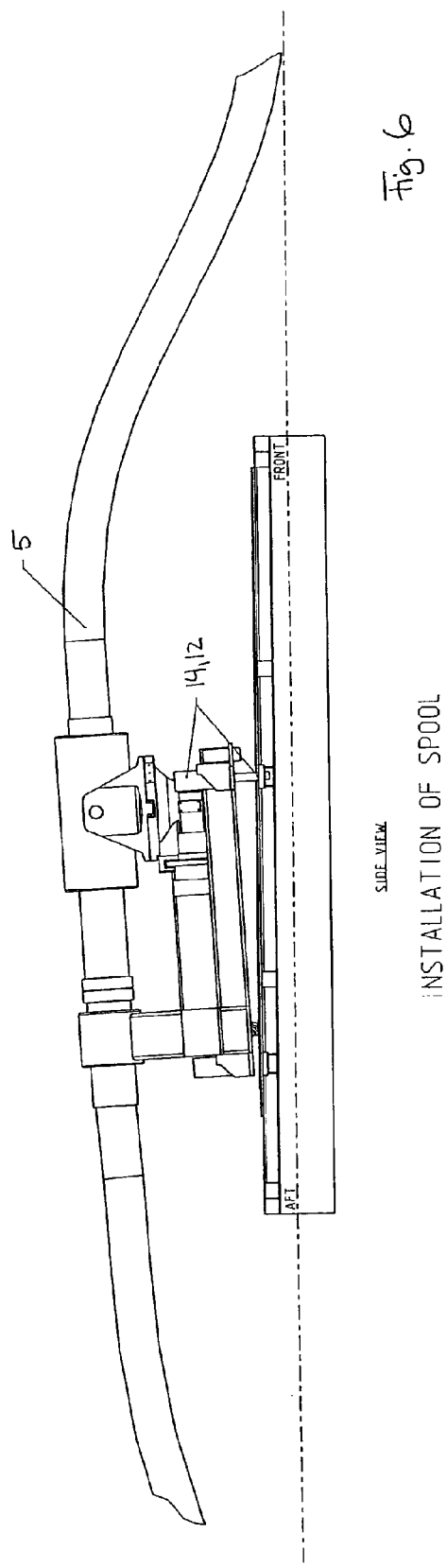

According to the invention there is provided a device for assistance in laying a pipeline 1 and especially connecting an end 2 of a pipeline 1 to another pipeline or another structure on the seabed (not shown). The pipeline end 2 may comprise a hub 3, to this hub 3 there is during laying of the pipeline 1 normally connected an end unit 4. The end unit may comprise for instance a pig launcher or other equipment. The end unit 4 is connected to the hub 3 of the pipeline 1 to both keep the pipeline from filling with water during laying but also protect the sealing surfaces of the hub.

As shown in FIG. 1 the structure of the device comprises a foundation structure 20 and a top structure 10. The foundation structure 20 will when the pipeline has been laid and connected be resting on the seabed. The pipeline 1 is connected to the top structure 10, such as to an arm of the top structure 10. The arm extends away from the rest of the structure, to provide good access to the hub of the pipeline end connected to the top structure. There is in the connection between the pipeline 1 and the top structure 10 arranged swivel means 16. The swivel means allow the pipeline 1 to rotate about its own longitudinal axis relative the top structure 10. The top structure 10 is connected to the foundation structure 20 with connection means comprising several elements. In the shown embodiment the connection means comprise first locking means 11 arranged close to an end of the top structure 10, facing the rest of the pipeline 1. These first locking means 11 will in a locked state keep the top structure 10 from pivoting relative the foundation structure 20. Such locking is used as the device is lowered to the seabed together with the end of the pipeline 1. Close to these first locking means 11 and thereby close to the end of the top structure facing the rest of the pipeline, there is arranged pivot means, in this embodiment formed by an abutment part 13 of the top structure 10. The pivot means may alternatively be hinge means. This abutment part 13 of the top structure is abutting a surface part 21 of the foundation structure 20. As the foundation structure is positioned relatively below the pipeline 1 and thereby lifts the pipeline 1 off the seabed for a distance and thereby has to carry the weight of this part of the pipeline 1, the abutment part 13 of the top structure and surface part 21 of the foundation structure will act as a hinged connection. The connection between the abutment part 13 and the surface part 21 will form a pivot axis for the top structure relative the foundation structure. There is additional second locking means 12 close to an opposite end of the top structure 10. This is the end of the top structure facing away from the rest of the pipeline. This end of the top structure 10 is allowed to pivot relative the foundation structure 20. The second locking means 12 is in this embodiment combined with jacking means 14. The jacking means 14 may be used to actively move this end of the top structure 10 so that it pivots about the abutment part 13. These second locking means 12 and/or jacking means 14 may also be locked when the top structure 10 has an inclined position relative the foundations structure 20. The second locking means 12 and/or the jacking means 14 may be one element or separate elements. The top structure 10 also comprises guiding means 15, for guidance of for instance the pipe spool as it should be connected to the pipeline end 2. The guiding means 15 is formed as a funnel with an open end facing away from the seabed, but may have different configurations. The top structure 10 is also in this embodiment arrange to be movable in a direction along the foundation structure 20. The top structure 10 may be shifted along the foundation structure 20, due to a gliding surface 22, whereon the top structure 10 glides. This movement is in a direction away from and towards the pipeline. The movement can thereby be said to be in a plane comprising the longitudinal axis of a pipeline. The locking means 11, 12 may be arranged to lock only the pivoting movement but may also be arranged to lock the shifting movement between the top structure and the foundation structure. The locking means may also be arranged so that it may release the shifting movement but still preventing pivoting movement, release both movements, or prevent shifting movement but allow pivoting movement. There may alternatively be different locking means. The foundation structure comprises stopping means, to limit the movement of the top structure along the gliding surface 22. The stopping means may for instance be an abutting surface on each end of the gliding surface. The foundation structure 20 is also adapted so that it will rest well on the seabed.

FIGS. 2 to 7 show different steps during the method according to the invention. In FIG. 2 there is shown the situation where the pipeline end 2 is connected to the top structure 10 of the device. The top structure 10 is locked to the foundation structure with both the first and second locking means 11, 12 keeping the top structure 10 mainly parallel with the foundation structure 20. The pipeline 1 is together with the device positioned on the seabed. The top structure 10 may be allowed to shift along the foundation structure 20 to aid in the positioning of the device and pipeline on the seabed.

In FIG. 3 the first and second locking means 11, 12 are released and the top structure 10 is allowed to pivot about the abutment part 13, which forms a fulcrum for the top structure 10. By this pivoting movement of the end 2 of the pipeline 1 more of the pipeline 1 will rests on the seabed. The pivoting movement is assisted by jacking means 14. The pivoting movement moves a main plane of the top structure 10, which in the first figure is mainly parallel with a main plane of the foundation structure 20, to form an angle α between them. This angle will depend on the height of the structure and especially the height the pivot point or pivot axis has in relation to the seabed.

In FIG. 4 the pipeline 1 which has been empty or filled with a gas during laying to reduce the weight of the pipeline, is being filled with water and pigs are launched through the pipeline 1. Also, the second locking means 12 and/or the jacking means 14 is locking the position of the top structure 10 relative the foundation structure 20 in the inclined position. Then as seen in FIG. 5 the end unit is removed from the end 2 of the pipeline 1 and the inclination of the end 2 of the pipeline 1 is measured. One may also measure the distance between the hub 3 of the pipeline 1 and a hub which should be connected to this pipeline 1.

In FIG. 6 one can see that a pipe spool 5 is connected to the pipeline end 2. The second locking means 12 or jacking means 14 are still locking the top structure 10 from pivoting relative the foundation structure 20 as the pipe spool is connected to the pipeline. This locking may be performed in an inclined position of the top structure, but the top structure may also be forced to a position mainly parallel with the foundation structure for the connection of the pipe spool. The top structure is however movable in a direction mainly parallel with a main plane of the foundation structure.

Figure 7:
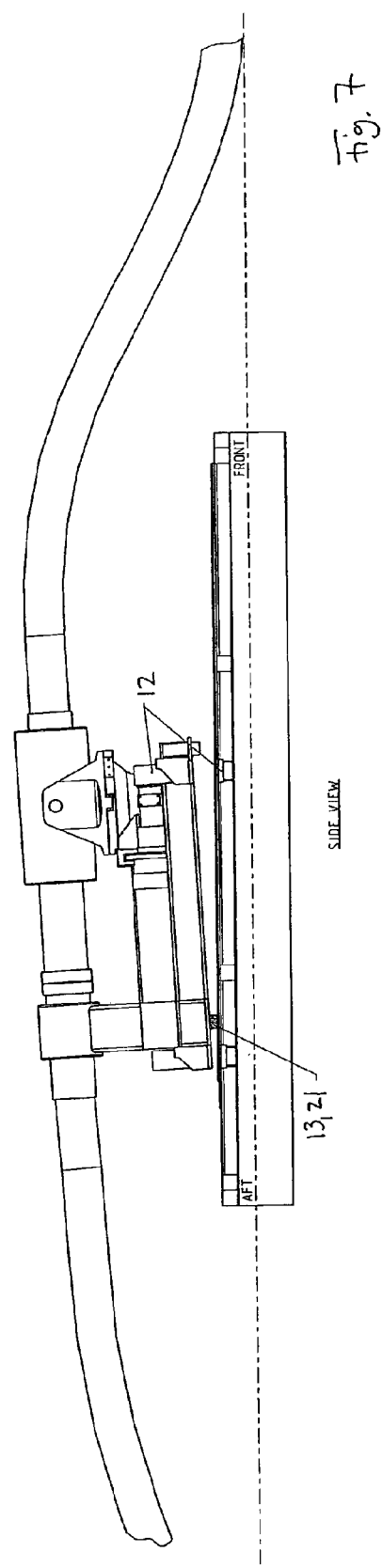

As seen in FIG. 7 the second locking means 12 and or jacking means 14 are released and also possibly removed from the structure, so that the pipeline end connected to the top structure has freedom to pivot relative the foundations structure and thereby relative the seabed in a connected and assembled state. The top structure will then with the abutment part in abutment against a surface part of the foundation structure act as a fulcrum for the top structure and thereby also for the connected pipeline.

The invention has now been explained with an embodiment. A skilled person will understand that there may be made alterations and modifications to this embodiment which is within the scope of the invention as defined in the claims.

The invention claimed is:

1. A method for laying pipelines on the seabed comprising the steps of:
    attaching an end of the pipeline to a structure;
    lowering the structure with the pipeline attached to the seabed;
    after the structure has landed on the seabed, allowing the end of the pipeline to pivot relative to the structure;
    measuring an inclination of the end of the pipeline relative to a horizontal plane;
    modifying a pipe spool such that an end of the pipe spool is given the same inclination as the end of the pipeline; and
    connecting the end of the pipe spool to the end of the pipeline;
    whereby the bending moments in the connection between the pipeline and the pipe spool are reduced.

2. The method according to claim 1, further comprising arranging the pipe spool to substantially eliminate vertical forces in the connection.

3. The method according to claim 1, further comprising arranging at least one part of the pipe spool to rest on a surface after connection.

4. The method according to claim 1, further comprising:
    locking the end of the pipeline in the inclined position before measuring the inclination; and
    releasing the locking of the end of the pipeline after the pipe spool is connected to the pipeline.

5. The method according to claim 1, further comprising the step of actively pivoting the end of the pipeline to the inclined position.

6. The method according to claim 1, wherein the step of allowing the end of the pipeline to pivot relative to the structure comprises allowing the end of the pipeline to pivot by its own weight.

7. The method according to claim 1, further comprising the step of removing an end unit connected to the end of the pipeline after the end of the pipeline has reached the inclined position.

8. The method according to claim 1, further comprising allowing the end of the pipeline to be shifted along the structure.

9. The method according to claim 1, further comprising forming the pipe spool with a curvature and at least one part adapted to rest on the seabed.

10. A pipeline installation device, comprising:
    a foundation structure adapted for positioning on the seabed;
    a top structure attached to the foundation structure and having means for attaching an end of a pipeline to the top structure, at least one side of the top structure being movable relative to the foundation structure;
    wherein the top structure is attached to the foundation structure with connection means which are arranged such that the top structure is allowed to pivot relative the foundation structure in a first state and is prevented from pivoting relative to the foundation structure in a second state; and
    wherein the means for attaching an end of a pipeline to the top structure comprises a swivel for allowing the means for attaching to rotate about a longitudinal axis of the pipeline.

11. The device according to claim 10, wherein the end of the pipeline is connected to an arm of the top structure.

12. The device according to claim 10, wherein the top structure is movable along the foundation structure.

13. The device according to claim 10, wherein the connection means comprises jacking means for pivoting an end of the top structure relative the foundation structure.

14. The device according to claim 10, wherein at least a part of the connection means is removably attached to the top structure.

* * * * *